(12) United States Patent
Hendriksen

(10) Patent No.: US 6,330,379 B1
(45) Date of Patent: Dec. 11, 2001

(54) CASCADED OPTICAL SWITCH COMPRISING AT LEAST ONE GATE

(75) Inventor: Berend Hendriksen, Zoetermeer (NL)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/463,781

(22) PCT Filed: Jul. 6, 1998

(86) PCT No.: PCT/EP98/04182

§ 371 Date: May 12, 2000

§ 102(e) Date: May 12, 2000

(87) PCT Pub. No.: WO99/06874

PCT Pub. Date: Feb. 11, 1999

(30) Foreign Application Priority Data

Aug. 1, 1997 (NL) ................................................. 97202397

(51) Int. Cl.$^7$ ........................................................ G02B 6/35
(52) U.S. Cl. ............................ 385/16; 385/17; 385/45
(58) Field of Search .......................... 385/15–23, 39–42, 385/45, 48

(56) References Cited

U.S. PATENT DOCUMENTS

| | | |
|---|---|---|
| 4,932,736 | 6/1990 | Su . |
| 4,934,775 * | 6/1990 | Koai .................................... 385/16 X |
| 5,655,037 * | 8/1997 | Duchet et al. ........................... 385/16 |
| 5,655,038 * | 8/1997 | Schilling ................................ 385/16 |

FOREIGN PATENT DOCUMENTS

| | | | |
|---|---|---|---|
| 61-56328 * | 3/1986 | (JP) | ......................................... 385/17 |
| 63-50193 * | 3/1988 | (JP) | ......................................... 156/69 |
| WO 96/23389 | 8/1996 | (WO) . | |
| WO 96 38756 | 12/1996 | (WO) . | |
| WO 99/06874 | 2/1999 | (WO) . | |

OTHER PUBLICATIONS

Hiroshi Terui et al: "Lossless 1X4 Laser Diode Optical Gate Switch" Journal of Lightwave Technology, vol. 9, No. 11, Nov. 1, 1991, pp. 1518–1522.

International Search Report for PCT/EP98/04182, Oct. 1998.

* cited by examiner

Primary Examiner—John D. Lee
(74) Attorney, Agent, or Firm—Lacasse & Associates; Randy W. Lacasse; Kevin E. Greene

(57) ABSTRACT

The invention pertains to a (cascaded) optical switch at least comprising one input path, a number of output paths, one or more switch or splitter stages each comprising one or more optical switches or splitters, and at least one gate for optically disconnecting the output paths from the input path, wherein that gate is located at or near the input path. The cascaded switches according to the present invention are compact exhibit a reduced complexity and an improved insertion loss.

16 Claims, 1 Drawing Sheet

CASCADED OPTICAL SWITCH COMPRISING AT LEAST ONE GATE

CROSS-REFERENCE TO RELATED APPLICATIONS

Not Applicable

STATEMENT REGARDING FEDERALLY SPONSORED RESEARCH OR DEVELOPMENT

Not Applicable

Reference to a Microfiche Appendix

Not Applicable

BACKGROUND OF THE INVENTION

1. Field of the Invention

The invention pertains to a (cascaded) optical switch at least comprising one input path, a number of output paths, one or more (preferably two or more) switch or splitter stages each comprising one or more optical switches or splitters, and at least one gate for optically disconnecting at least one of the output paths from the input path.

2. Description of the Related Art

Such a cascaded optical switch is known from E. J. Murphy, "Enhanced performance switch arrays for optical switching networks," *Proceedings 8th European Conference on Integrated Optics*, Apr. 2–4, 1997, pp. EFD5-1/563–EFD5-4/566. FIG. 3b of this publication shows a strictly non-blocking 4×4 switch matrix comprising, in its input stage, four 1×4 cascaded switches each consisting of an input path, a first stage consisting of a passive 3 dB splitter, a second stage consisting of two "dump" or signal disconnect switches, a third stage consisting of two 1×2 switches, and four output paths.

The dump switch stage makes it possible for any or all of the signal paths to be optically disconnected from the network of which they are a part. Disconnection of all signals may be necessary, for instance, during rearrangement of the 4×4 switch matrix or for diagnostics.

FIG. 1 of WO 96/08932 shows a tree-structured (i.e., cascaded) 1×8 optical switch wherein each output path is allocated a gate for selectively blocking and unblocking said output as a function of the state of the 1×2 switch nearest to the output. Disconnection of all the outputs from the input, as required during the above-described rearrangement, can be achieved by activating all eight gates so as to block all outputs.

Another example of a cascaded switch is shown in FIG. 1 accompanying this patent application. This cascaded switch comprises one input path (4), a first switch stage (1) consisting of one thermo-optical 1×2 switch (viz. a y-junction switch provided with two heater elements), a second switch stage (2) consisting of two thermo-optical 1×2 switches (the first and second stages forming a 1×4 switch), a third stage (3) consisting of four gates (6; in this case thermo-optical 2×1 switches), and four output paths (5/5'). Again, optical disconnection of all the outputs from the input can only be achieved by activating all four gates so as to block all outputs.

BRIEF SUMMARY OF THE INVENTION

It is an object of the present invention to reduce the number of gates and the power consumption of cascaded switches as described in the first paragraph. This object is achieved by locating the gate at or near the input path of the (cascaded) switch, which gate is integrated in a switch in the stage nearest to the input path and is suitable to optically disconnect the input path from the output paths of the switch and/or serves to optically disconnect the input path from (all) the output paths of the switch.

Thus, the need for a gate at each output path no longer exists and, e.g., in a 1×N cascaded switch the reduction of the number of gates amounts to ((N−1/N)), which means a reduction of 87.5% for a 1×8 cascaded switch. Also, the reduction in power consumption and the reduction of the number of electrical contacts needed to drive the cascaded switch are commensurate with the reduction of the number of gates.

DETAILED DESCRIPTION

By doing so, the length of the cascaded switch is reduced considerably without reducing the effectivity of the blocking action. More importantly, however, the insertion loss of the cascaded switch is, in some instances, reduced by 40% or more. Alternatively, this reduction in length provides can be used for the addition of further elements (e.g., means for suppressing crosstalk).

A very effective way of achieving said integration is by way of an embodiment wherein the optical switch or switches in the stage nearest to the input path are 1×(P+1) switches, whereas the optical switches or splitters in the remaining stages are 1×P switches or 1×P splitters. One of the (P+1) outputs of the switch or switches in the stage nearest to the input path in these instances serves as the gate. This more compressed design provides devices with a higher density (more input and output ports per $cm^2$) and, due to the reduced length of the device, results in a still further reduction of the insertion loss. Furthermore, the number of driving means (viz., heating elements for thermo-optical switches and electrodes for electro-optical switches) is further reduced in this design. Preferably P equals 2 or 3, because, in that case, existing and proven elements can be used, which improves reliability and reduces costs.

Figure 1:
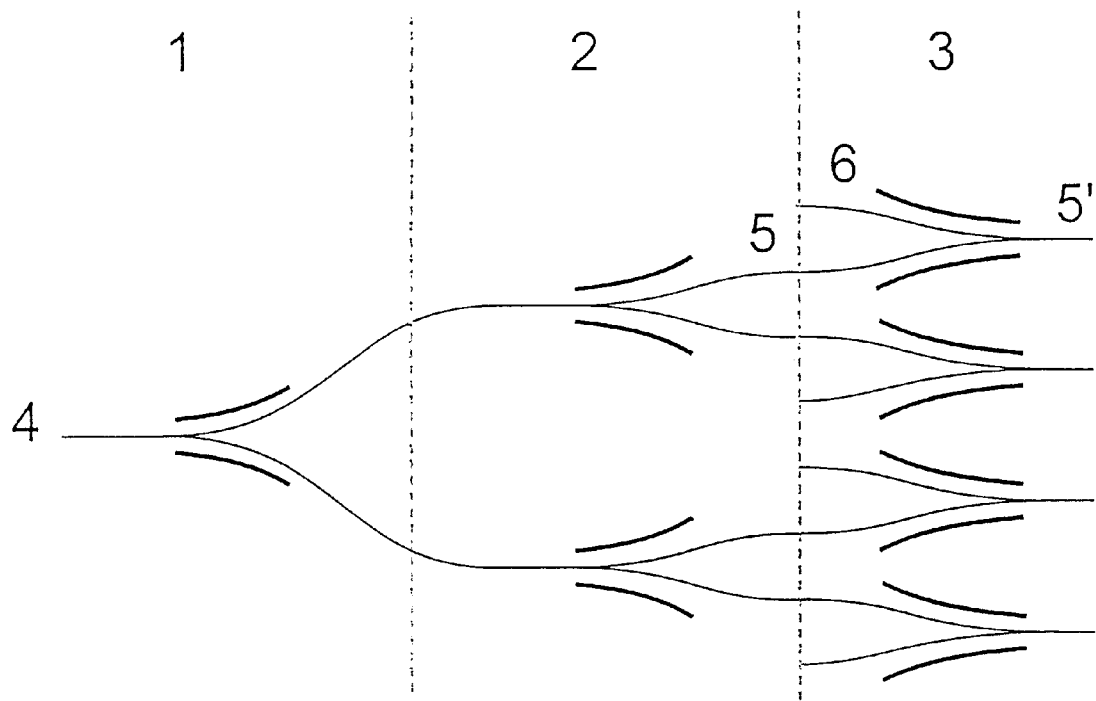
FIG. 1 illustrates a prior art cascaded switch.
Figure 2:
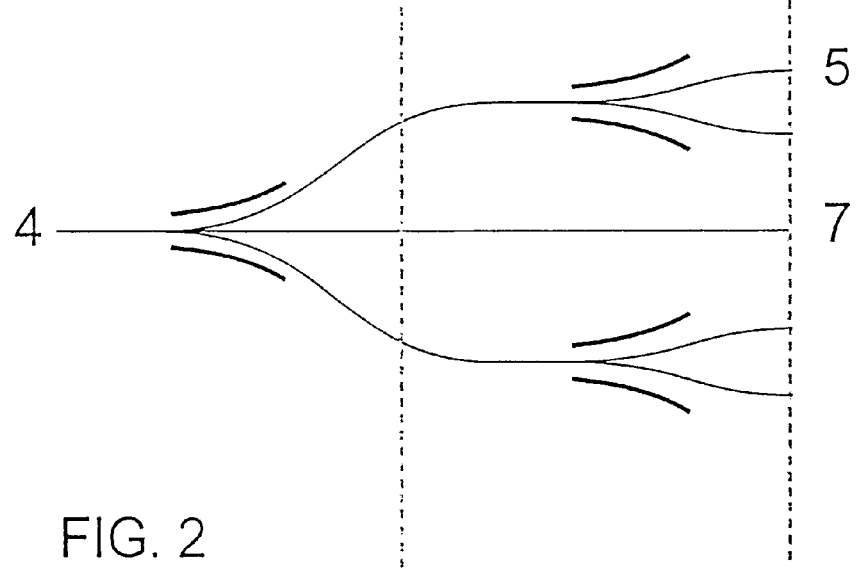
FIG. 2 illustrates a preferred example of an embodiment of the present invention in which the gate is integrated in a switch in the stage nearest the input path.

A preferred example of such an embodiment is shown in FIG. 2. The first switch stage (1) consists of a 1×3 switch comprising a gate (7) terminating next to the output paths (5) of the cascaded switch, while the second switch stage (2) consists of two 1×2 switches (each connected to one of the actual outputs of the 1×3 switch), thus forming a 1×4 optical switch. Comparison with the 1×4 switch according to FIG. 1 clearly shows that the invention (FIG. 2) enables a considerable reduction in length, area, and of the number of switches (3 instead of 7). The insertion loss was reduced from 3,5 dB to 2,5 dB, i.e., by approximately 30%.

By using an absorber in conjunction with the gate, the power in the gate is transformed into a form of energy (for instance, heat) which can have no detrimental consequences for the functioning of the cascaded switch or the network in which it is integrated. The absorber can, e.g., be made of a metal. Alternatively, the power in the gate is coupled into the substrate on which the switch is built.

Also, the gates can be used to monitor the presence of a signal in the input path of the optical switch or, indeed, for still other functions.

The invention further pertains to an N×M optical switch matrix comprising at least one cascaded optical switch as described above (with N and M being independent integers, in some cases N equals M).

As explained above, disconnection of all signals may be necessary, for instance, during rearrangement of the N×M switch matrix. Additionally, each of the cascaded switches comprised in the N×M switch matrix according to the present invention through which no signal propagates, can be disconnected individually during normal operation of the N×M switch matrix. Thus, the effects of such an unwanted or unselected signal on the performance of the entire switch matrix is substantially avoided.

Preferably, the switches according to the invention are thermo-optical digital switches. Polymers are very suitable for manufacturing such switches, since even a modest temperature change can give rise to a large change in refractive index.

Devices according to the invention can be used with advantage in optical communications networks of various kinds. Generally, the optical components either will be directly combined with optical components such as light sources (laser diodes) or detectors, or they will be coupled to input and output optical fibres, usually glass fibres.

An integrated thermo-optical device may be built up, e.g., as follows. Underneath the waveguiding structure there is a support such as a glass or silicon substrate. On the substrate the following successive layers can be identified: a lower cladding layer, a core layer (guiding layer), and an upper cladding layer. The cladding material may be glass or a polymeric material. Said cladding layers have an index of refraction lower than that of the core layer. The core layer, which comprises the actual waveguiding channels or paths, may be made of inorganic or polymeric material.

When using a polymeric core layer, the use of polymeric cladding layers is preferred. In these all-polymeric devices it is easy to adjust the physical properties of the various layers one to the other, providing a more stable device. The polymers used for these layers are so-called optical polymers. For details concerning the theory on which the operation of thermo-optical switches is based and details about suitable materials and manufacturing methods reference may be had to WO 96/38756.

As will be clear from the above, the gates primarily serve to optically disconnect the input path from the output paths of the cascaded switch. Other suitable terms for gates are, e.g., shutter and idle port (depending, amongst others, on the configuration of thereof). Suitable configurations are, e.g., additional branches, cut-off waveguides, and Mach-Zehnder interferometers.

The switches comprised in the stages of the (cascaded) switch may, for instance, be 1×2 or 1×3 DOS switches, 2×2 switches, Mach-Zehnder switches, or directional coupler switches.

Within the framework of the present invention, the output paths and the input path are considered optically disconnected when the ratio of optical power in the input path over the power in the said output path is either larger than 15 db or such that the optical power in the output at hand has dropped below the level required by the system into which the switch is integrated.

What is claimed is:

1. A cascaded optical switch at least comprising one input path, a number of output paths, one or more switch or splitter stages each comprising one or more optical switches or splitters, and at least one gate for optically disconnecting at least one of the output paths from the input path, characterized in that the gate is integrated in a switch in the stage nearest to the input path and is suitable for other functions than as a polarization compensator only, said cascaded optical switch also characterized in that the optical switch or switches in the stage nearest the input path are 1×(P+1) switches, whereas the optical switches or splitters in the remaining stages are 1×P switches or splitters.

2. A cascaded optical switch according to claim 1, wherein said cascaded optical switch is used in an N×M optical switch matrix.

3. A cascaded optical switch, according to claim 1, characterized in that P equals 2 or 3.

4. A cascaded optical switch according to claim 3, wherein said cascaded optical switch is used in an N×M optical switch matrix.

5. A cascaded optical switch, according to claim 1, characterized in that it comprises two or more switch or splitter stages.

6. A cascaded optical switch according to claim 5, wherein said cascaded optical switch is used in an N×M optical switch matrix.

7. A cascaded optical switch, according to claim 5, characterized in that P equals 2 or 3.

8. A cascaded optical switch according to claim 7, wherein said cascaded optical switch is used in an N×M optical switch matrix.

9. A cascaded optical switch at least comprising one input path, a number of output paths, one or more switch or splitter stages each comprising one or more optical switches or splitters, and at least one gate for optical disconnecting at least one of the output paths from the input path, characterized in that the gate is integrated in a switch in the stage nearest to the input path and is suitable to optically disconnect the input path from the output paths, said cascaded optical switch also characterized in that the optical switch or switches in the stage nearest the input path are 1×(P+1) switches, whereas the optical switches or splitters in the remaining stages are 1×P switches or splitters.

10. A cascaded optical switch according to claim 9, wherein said cascaded optical switch is used in an N×M optical switch matrix.

11. A cascaded optical switch, according to claim 9, characterized in that P equals 2 or 3.

12. A cascaded optical switch according to claim 11, wherein said cascaded optical switch is used in an N×M optical switch matrix.

13. A cascaded optical switch, according to claim 9, characterized in that it comprises two or more switch or splitter stages.

14. A cascaded optical switch according to claim 13, wherein said cascaded optical switch is used in an N×M optical switch matrix.

15. A cascaded optical switch, according to claim 13, characterized in that P equals 2 or 3.

16. A cascaded optical switch according to claim 15, wherein said cascaded optical switch is used in an N×M optical switch matrix.

* * * * *